R. J. G. KENNARD
Implement for Holding Hot Corn, &c.
No. 164,307. Patented June 8, 1875.
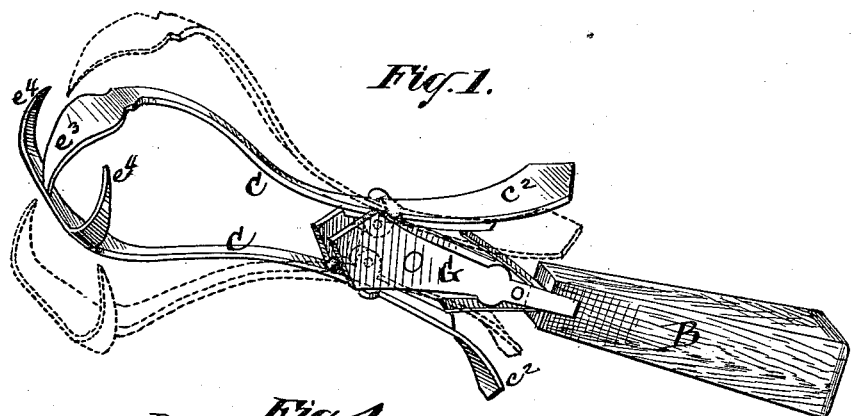
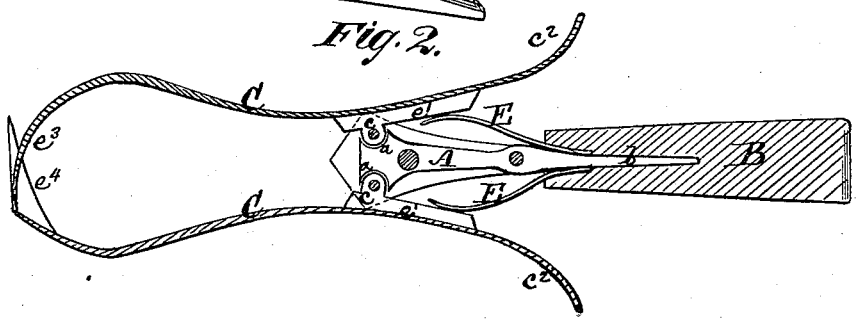
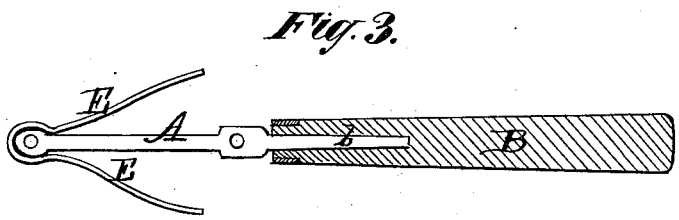

UNITED STATES PATENT OFFICE.

ROBERT G. J. KENNARD, OF BROOKLYN, NEW YORK.

IMPROVEMENT IN IMPLEMENTS FOR HOLDING HOT CORN.

Specification forming part of Letters Patent No. 164,307, dated June 8, 1875; application filed March 25, 1875.

*To all whom it may concern:*

Be it known that I, ROBERT G. J. KENNARD, of Brooklyn, in the county of Kings and State of New York, have invented an Improved Implement for Holding Hot Corn and for similar purposes; and I do hereby declare that the following is a full, clear, and exact description of the same, reference being had to the accompanying drawing forming part of this specification.

My invention consists in a novel construction and combination of a handle, a shank, a pair of pivoted levers furnished with forks, claws, or mandibles, and a spring or springs, whereby I produce an implement for table use for holding hot corn, and for serving other articles of food, such as salad, cresses, pickles, shredded meats, or such other articles as cannot be conveniently served with a spoon or a fork.

In the accompanying drawing, Figure 1 is a perspective view of my improved implement. Fig. 2 is a longitudinal section of the same. Fig. 3 is a partly sectional view of a modification. Fig. 4 is a detail view.

A represents a shank formed with a tang, $b$, by which it is attached to a handle, B, in a similar manner to that in which table-knives are attached to their handles. The outer portion of the shank has two semicircular notches or grooves, $a\ a$, formed on two opposite sides. C C represent two levers, on the inner side of each of which is a perforated lug, $c$, having its edge corresponding with the form of the notches $a$. On two opposite sides of the shank are attached two plates, D D, (see Fig. 4,) the outer portions of which extend laterally, and cover the ends of the notches or grooves $a$, so as to form cavities or recesses. The levers C C are pivoted to the shank by inserting the lugs $c\ c$ in the notches $a$, and passing rivets through the portions of the plates D D, which overhang said notches or grooves so that the said levers may vibrate toward or from each other. Between the handle B and the fulcrums of the levers, are two springs, E E, each of which has its inner end attached to the handle where the shank enters the same, and its outer end bent outward so as to bear against the inner side of the long arm of the lever E, which may be provided with a bearing-surface, $e^1$, for the purpose of receiving the friction of the spring. By means of these springs, the long arms or inner ends of the levers are pressed outward, and their short arms or outer ends are pressed toward each other, as shown in Fig. 2, and in full lines in Fig. 1. Instead of being made in two pieces, the springs E may be made in one piece of metal, bent midway of its length, and passed around the end of the shank with its ends extending toward the handle, as shown in Fig. 3, in which form their operation will be the same as above described. The inner ends of the levers are curved outward, and made in such shape as to form finger-pieces $c^2\ c^2$, so that when the implement is held by the handle the finger-pieces are easily grasped by the thumb and finger. The outer ends or jaws of the levers are forked or notched in any suitable manner to enable them to co-operate with each other to accomplish the purpose for which the implement is intended. When made in the form shown herein, one of the levers is provided with one claw, $e^3$, and the other with two claws, $e^4$, so that the claw $e^3$ will pass between the two claws $e^4$ when there is nothing between the jaws.

In order to give a finished appearance to the implement thus constructed, caps or casings G are attached, by riveting, or in any other suitable manner, over the plates D, so as to protect and conceal the working portions. These caps may be ornamented in any suitable manner.

When the finger-pieces are pressed by the thumb and finger, the jaws are opened to the position shown in dotted lines in Fig. 1. When the finger-pieces are released, the jaws resume the position shown in full lines.

This implement will be found very useful at the table for holding hot corn while being eaten, or while the corn is being cut from the cob, or for holding any article of food not suitable to be held by the fingers, and also for lifting or transferring from one dish to another certain articles of food which cannot be so conveniently lifted with a spoon or fork, such as salad, cresses, pickles, shredded meats, &c.

The design of the article may be varied according to the fancy, and the shape of the jaws may be governed by the nature of the use for which the implement is particularly intended.

What I claim as new, and desire to secure by Letters Patent, is—

1. The handle B, provided with the shank A, and plates D, attached to the sides of the shank, in combination with the levers C, pivoted between the plates D, and with springs E for pressing the jaws of the levers apart, substantially as described.

2. The caps or casings G, attached to the plates D, for protecting and concealing the working parts of the implement, substantially as described.

R. G. J. KENNARD.

Witnesses:
WM. F. SMITH,
R. G. J. KENNARD, Jr.